Aug. 22, 1967     R. R. MARCHMAN     3,336,969
VEHICLE WINDSHIELD AND REAR WINDOW COVER
Filed June 15, 1965
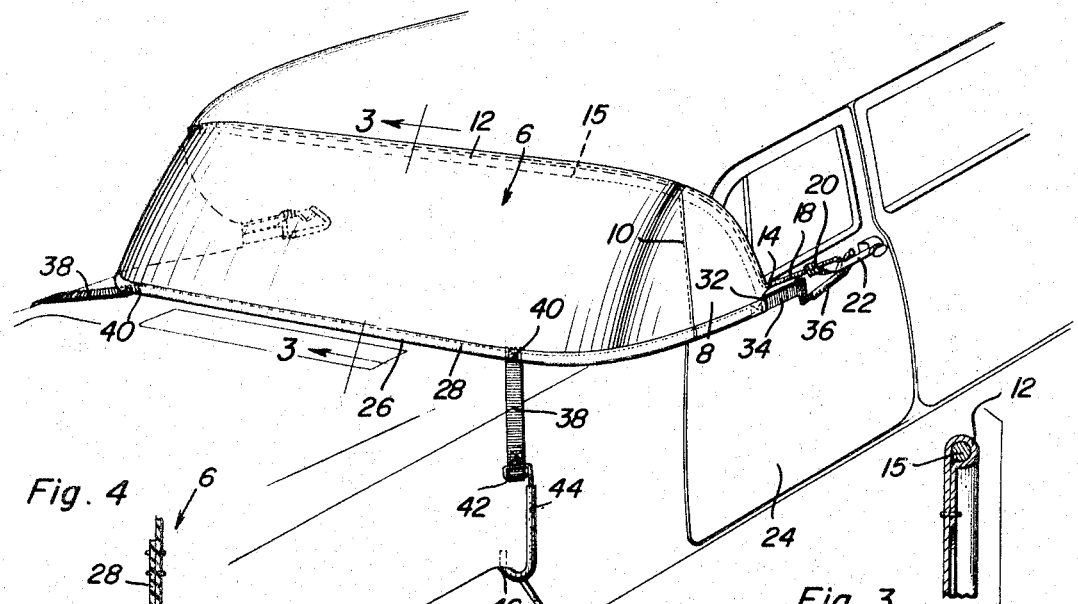
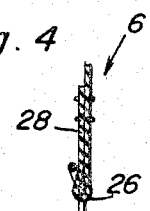
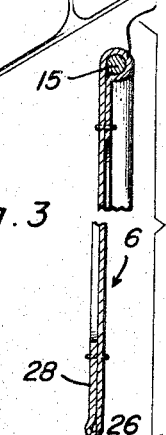
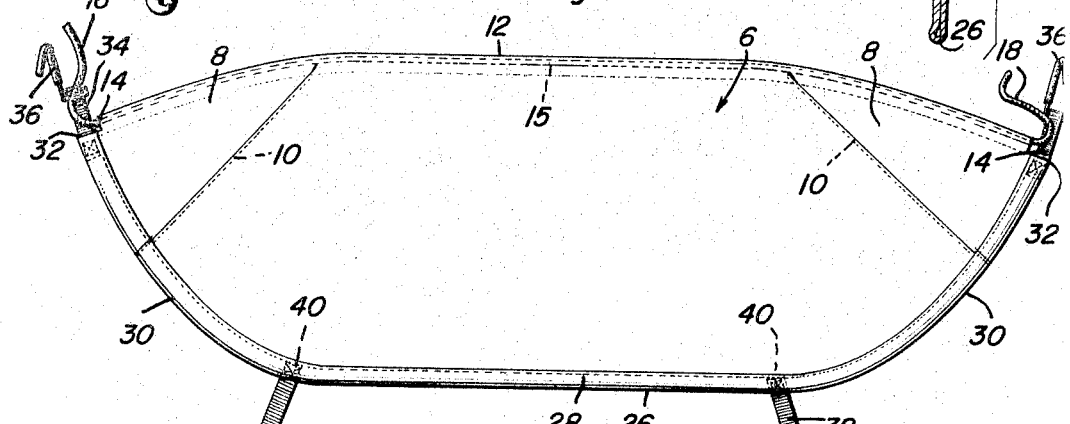
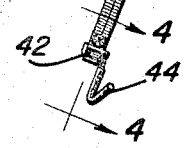
Robert Ransom Marchman
INVENTOR.

United States Patent Office 3,336,969
Patented Aug. 22, 1967

3,336,969
VEHICLE WINDSHIELD AND REAR
WINDOW COVER
Robert Ransom Marchman, Rte. 1,
Newnan, Ga. 30263
Filed June 15, 1965, Ser. No. 464,102
5 Claims. (Cl. 160—368)

ABSTRACT OF THE DISCLOSURE

This disclosure has to do with a horizontally elongated flexible sheet of water repellent material which is fashioned into a conformable cover for a windshield or a rear window. It has an open-ended hem along its top edge through which a draw cord extends so that its extended ends can be tied to available door handles. The lower edge is provided with a reinforcing binding. Elastic straps (arranged in pairs) are equipped with terminal hooks which have the capability of temporary anchorage and serve to tautly spread and hold the cover in place.

---

This invention relates to an improved flexible windshield cover which is functionally designed and uniquely structurally adapted to enable a user thereof to keep the exterior surface of the windshield (or rear window of an automobile) clear for safe driving, and has to do with a readily applicable and removable weatherproof cover which can be spread over the windshield when the user's automobile is parked at home, on an open parking lot, or elsewhere.

Many and varied styles and forms of sheet material covers have been devised and offered for use as temporarily applicable and removable weather shields and to enable a user to cope with the depositing and accumulation of snow, sleet, frost, and dirt and dust for either overnight use or whenever necessary or desired daytime use. As a matter of fact the state of the art to which the invention relates is shown in such patents as Moszelt 2,-614,630 and Ketchum 2,979,129 to which the reader may refer if so inclined. It follows that it is old in the art to provide a windshield or rear window cover which is of lightweight flexible sheet material and which is patterned so that it lends itself to satisfactory coverage of the surface over which it is spread and retained. The main difference, therefore, in prior art adaptations as well as in the invention at bar have to do with the ways and means whereby the cover is attached, detached and reliably held in place.

In carrying out the present invention the cover itself is distinctive in shape and performance in that the transverse end portions of the cover are arcuately shaped to provide terminal flaps which are such that they lend themselves to a satisfactory fit when applied to the surfaces which are covered and shielded thereby.

More particularly novelty is predicated on a water repellant sheet characterized by an upper longitudinal edge provided with a hem. This hem is coextensive in length with the length of the sheet and is open at its ends and serves to contain a flexible draw-cord. This draw-cord has its ends extended well beyond the open ends of the hem where they are then accessible and can be tied to the door handles (front or back depending on whether the cover is on the windshield or rear window).

The cover also features a reinforced binder along the bottom edge which has curvate end portions terminating close to but spaced slightly from the open ends of the hem. More explicitly, novelty is predicated on the use of elastic hook-equipped straps which are attached at inner ends to the end portions of the bottom edge binder and which cooperate with additional elastic holddown straps provided with rubber covered or equivalent hooks which can be releasably engaged with the bottom edge of the automobile fenders.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a fragmentary portion of an automobile showing the front end and with the windshield provided with the improved cover and illustrating how the latter is applied and constructed;

FIGURE 2 is a plan view of the cover as it appears when spread out flatwise;

FIGURE 3 is a fragmentary section on an enlarged scale taken on the plane of the section line 3—3 of FIGURE 1; and FIGURE 4 is likewise an enlarged fragmentary detail section in elevation taken on the plane of the section line 4—4 of FIGURE 2.

The cover is characterized by a waterproof flexible substantially inelastic sheet or panel which is denoted, generally speaking, by the numeral 6 in FIG. 2. Although the terminal end portions to the left and right in FIG. 2 could be integral with the main body portion it has been found that it is desirable to cut the coacting end portions of the component parts so as to provide sector-shaped end portions constituting flaps 8, the latter having inner edges stitched or otherwise joined to the oblique angled edges of the body portion as at 10. Considering these components as though the cover were a single piece sheet it will be seen that the upper longitudinal edge portion is folded upon itself and formed into a hem 12 having open ends 14 as shown best in FIG. 2. This hem is of a length coextensive with the length of the overall cover and is provided with and encloses a slidable draw-cord, the terminal end portions of which are denoted at 16 and 18 in FIG. 2. It follows that when the cover is applied in the manner shown in FIG. 1 the terminal ends of the cord can be tied as suggested at 20 to the handle 22 on the automobile or vehicle door 24. The lower edge of the overall cover or panel is denoted at 26 and is doubled upon itself as at 28 and stitched to provide a reinforcing edge binder in the manner shown. The major part of the lower edge is substantially parallel with the straight upper edge portion 12 while the respective left and righthand portions are arcuately curved as denoted at 30 in FIG. 2. Thus the pad or panel has the general elongated shape shown in FIG. 2 when it is placed flatwise on a surface.

It will be noted that the terminal end portions 32 of the edge binder terminate short of the open ends 14 of the hem so as not to interfere with the handling and tying down of the ends to the handle as suggested at 20 in FIG. 1. For further and more reliable anchorage and maintenance the end portions 32 are provided with elastic straps 34 which in turn are provided with hooks which are of a size and shape to be releasably engaged with the door handle 22 in the manner shown. Each hook is protectively coated with rubber or plastic and thus the covered hook is denoted at 36. It follows that the gradually narrowing end portions to the left and right of the cover come to a point and the straps 34, hooks 36, and end portions 16 and 18 of the tying cord can be readily attached and detached.

In order to obtain the desired security of application and retention additional depending holddown straps are employed. This is to say two identical elastic holddown straps 38 are provided. These straps are stitched or otherwise connected at their upper ends at 40 to the edge binder 28. They are provided at their lower ends with suitable loops 42 to which cooperating attaching portions of the anchoring or holddown hooks 44 are connected. Each hook is of a suitable size and shape and is rubber coated or otherwise protectively shielded. Accordingly, these hooks 44 can be engaged releasably with an edge portion of a fender as suggested at 46 in FIG. 1.

Experience has repeatedly shown that the cover herein illustrated and described aptly and well serves the purposes for which it has been constructed. In fact it has proved out to be an advantageous accessory for the car owner without a garage and who ordinarily must leave his car parked in the driveway, on the street overnight, or in a downtown parking area during the day. It is evident that the cover functions to maintain one's windshield or rear window clear on frosty and snowy nights and where the car is parked under trees it minimizes the likelihood of dust and dirt from trees depositing on and clouding up the windshield. The user of the invention finds it necessary to merely apply the cover means when the car is at a standstill and readily detach it when he is ready to drive away. This is particularly helpful in the morning when one may be in a hurry and would not have time to scrape off frost or snow or, for that matter, to attempt to take time to wipe off the windshield.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automobile windshield cover functionally designed and structurally adapted to cope with inclement weather and also to keep the exterior surface clean and clear for safe driving comprising: a horizontally elongated flexible sheet of water repellent material and having an upper longitudinal edge provided with a hem coextensive in length with the length of said sheet and open at its ends, a lower longitudinal edge also coextensive in length with the length of said sheet and doubled upon itself to provide a reinforcing binder, the major median portion of said thus bound edge being linearly straight and approximately parallel with the opposed median part of said hem and the left and right end portions being arcuately curved and directed toward and terminating adjacent but slightly short of the respective open ends of said hem, a first pair of elastic end straps having inner ends secured to the respectively oriented terminal ends of said left and right end portions and having free outer ends provided with strap tautening and anchoring hooks capable of being hooked by hand on the door handles with which they are detachably connectible, and a draw-cord threaded through said hem with free terminal ends extending through and beyond the left and right open ends and adapted to provide tying elements which can also be connected by tying to the door handles with which they are cooperable.

2. The structure according to claim 1 and wherein said straps are proportionately narrow and said hooks are protectively plastic-coated to prevent damage to the parts and surfaces contacted thereby.

3. The structure according to claim 1 and wherein the entire lower edge is doubled upon itself and stitched and thus secured to provide said reinforcing binder, the inner ends of said straps being secured for assured retention purposes to the adjacent respectively cooperable terminal ends of said binder.

4. A readily attachable and detachable cover for an automobile rear window or, alternatively, a windshield, said cover being functionally designed and structurally adapted for temporary use in a manner to cope with inclement weather conditions and with a view toward keeping the exterior surface clean and clear for safe driving comprising: a horizontally elongated flexible sheet of water repellant material having the capability of being spread tautly over the entire surface which is to be covered and having an upper longitudinal edge provided with a hem coextensive in length with the length of said sheet and being open at its respective ends, a lower longitudinal edge also coextensive in length with the length of said sheet and doubled upon itself and stitched in place to provide a reinforcing binder, the major median portion of said thus bound edge being substantially parallel with the opposed median part of said hem and the left and right end portions being directed toward and terminating adjacent but just short of the position of the respective open ends of said hem, a first pair of end straps having inner end portions secured to the respectively oriented terminal ends of said left and right end portions and having free outer ends provided with strap tautening and anchoring hooks capable of being hooked by hand on the door handles with which they can be and are detachably connected, and a draw cord threaded slidingly through said hem and having free terminal end portions extending a requisite distance through and beyond the left and right open ends of said hem and being thus adapted to be tied temporarily to door handles with which they are conveniently cooperable.

5. The structure defined in claim 4 and, in combination, a second pair of straps having upper ends secured to longitudinally spaced median portions of said lower marginal edge and depending angularly from said lower marginal edge and having free lower ends provided with holddown hooks which are adapted to be detachably anchored and retained on lower edges of the automobile fenders with which they can be and are connected.

References Cited
UNITED STATES PATENTS

| | | | |
|---|---|---|---|
| 2,437,845 | 3/1948 | Wyeth | 160—368 X |
| 2,614,630 | 10/1952 | Moszelt | 160—368 |
| 2,624,406 | 1/1953 | Szychowski et al. | 160—368 |
| 2,718,912 | 9/1955 | Zimmerman | 160—368 |
| 2,821,248 | 1/1958 | Irvine | 160—368 |
| 2,907,384 | 10/1959 | Spratt et al. | 160—368 |
| 2,979,129 | 4/1961 | Ketchum | 160—368 |

DAVID J. WILLIAMOWSKY, Primary Examiner.

REINALDO P. MACHADO, Examiner.

P. C. KANNAN, Assistant Examiner.